(12) United States Patent
Pringle et al.

(10) Patent No.: US 7,174,998 B2
(45) Date of Patent: Feb. 13, 2007

(54) SUBMERGED ELECTRIC FLUID PUMP

(75) Inventors: Hal Pringle, Bloomfield, MI (US); Robert D. Keefover, Farmington Hills, MI (US); Michael J. Halsig, Warren, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 09/977,774

(22) Filed: Oct. 15, 2001

(65) Prior Publication Data

US 2003/0070879 A1   Apr. 17, 2003

(51) Int. Cl.
*F04B 23/00* (2006.01)

(52) U.S. Cl. ..................... 184/6.28; 417/366
(58) Field of Classification Search .............. 184/6.28, 184/26, 27.1, 31, 106; 417/366, 369, 423.3, 417/410.4
See application file for complete search history.

(56) References Cited

U.S. PATENT DOCUMENTS

| | | | | |
|---|---|---|---|---|
| 2,634,686 A | * | 4/1953 | Schmitter | 184/6.28 |
| 3,135,213 A | * | 6/1964 | Smith et al. | 417/368 |
| 3,746,472 A | * | 7/1973 | Rupp | 417/9 |
| RE29,445 E | | 10/1977 | Nusser et al. | |
| 4,185,717 A | * | 1/1980 | Ford et al. | 184/6.28 |
| 4,421,453 A | * | 12/1983 | Hoff et al. | 184/31 |
| 4,642,030 A | * | 2/1987 | Friebe et al. | 417/203 |
| 4,834,040 A | * | 5/1989 | Yoshida | 184/6.28 |
| 4,978,282 A | * | 12/1990 | Fu et al. | 417/360 |
| 5,007,806 A | * | 4/1991 | Bellis et al. | 417/360 |
| 5,090,876 A | * | 2/1992 | Hashizume et al. | 417/410.5 |
| 5,181,837 A | * | 1/1993 | Niemiec | 417/350 |
| 5,431,547 A | * | 7/1995 | Boyko | 417/366 |
| 5,522,476 A | * | 6/1996 | Holman | 184/6.12 |
| 5,544,540 A | * | 8/1996 | Holman | 74/467 |
| 5,605,448 A | * | 2/1997 | Martin, Sr. | 417/360 |
| 5,725,362 A | * | 3/1998 | Zepp et al. | 417/366 |
| 6,034,465 A | | 3/2000 | McKee et al. | |
| 6,106,240 A | * | 8/2000 | Fischer et al. | 417/203 |
| 6,488,486 B1 | * | 12/2002 | Debleser | 417/423.8 |

FOREIGN PATENT DOCUMENTS

| | | |
|---|---|---|
| DE | 196 27 668 | 1/1998 |
| EP | 0 509 724 | 10/1992 |
| EP | 0 754 865 | 1/1997 |
| JP | 05214916 A * | 8/1993 |

OTHER PUBLICATIONS

English Abstract of DE 196 27 668 Jan. 15, 1998.
English Abstract of EP 0 509 724 Oct. 21, 1992.
English Abstract of EP 0 754 865 Jan. 22, 1997.

* cited by examiner

*Primary Examiner*—Chong H. Kim
(74) *Attorney, Agent, or Firm*—Warn, Hoffmann, Miller & LaLone, P.C.; Greg Dziegielewski

(57) ABSTRACT

An electric fluid pump for a transmission, transfer case or an oil reservoir. The pump is contained within the transmission, transfer case or engine oil reservoir and has an open housing which allows fluid into the motor for cooling and lubrication.

19 Claims, 2 Drawing Sheets

SUBMERGED ELECTRIC FLUID PUMP

TECHNICAL FIELD

The present invention relates to a fluid pump. More specifically, the present invention relates to a submergible electrically driven fluid pump for a transmission, transfer case or engine of a vehicle.

BACKGROUND OF THE INVENTION

In vehicle, engine and transmission designs today, many fluid pumps are used for pumping of fluids to engine, transmission systems and transfer cases. In the past, these pumps typically have been mechanical in many locations on the engine, such as the engine oil pump, for instance. Typically, it was believed that such pumps were critical to the operation of the vehicle and that mechanical operation of these pumps was more reliable than electrical pumps. Therefore, when designing transmissions or engines, for instance, it is necessary to design mechanical drives connected to the engine operating system, and provide attachments and porting for taking the oil from the oil pan and into the engine lubricating system. Mounting flanges are required for operative pumping of oil flow from the reservoir to the pump for pumping to the final destination. Inlet and outlet porting for the pump is typically contained in the pump housing, taking up valuable real estate.

In recent years, vehicle designs have advanced in many areas. For instance, electrical components have become increasingly more reliable. This has led to more usages of electrical components in vehicles. Weight considerations, specifically reduction in weight, has become increasingly important. This has led to a desire to simplify operations in design and manufacture, and use lighter weight components wherever possible. Additionally, size and space saving considerations have required many design changes in vehicles today. Also, mechanical operation does not readily allow for or demand pumping operations that are desirable in today's operating environment. Therefore, it is desirable to provide a pumping apparatus which will not require mechanical operation and which requires little or no design changes or additional space for simplifying of the pumping of oil or other fluids in today's vehicles.

SUMMARY OF THE INVENTION

Thus, in accordance with the present invention there is provided a fluid pump for pumping of fluid of a vehicle having a reservoir containing fluid therein. The pump includes a housing having a pump element therein. The housing and pump element are attached to an accompanying mounting face in the transmission or oil sump. The pump includes intake and exit ports therein for receiving fluid from the reservoir and pumping fluid to an exterior location.

The pump of the present invention allows an electrically driven fluid pump to be submerged in the fluid reservoir for pumping of the fluid. In many cases, the pump in accordance with the present invention can be mounted to the existing plate used for pump porting.

A further understanding of the present invention will be had in view of the description of the drawings and detailed description of the invention, when viewed in conjunction with the subjoined claims.

DETAILED DESCRIPTION OF THE PREFERRED EMBODIMENTS

Figure 1:
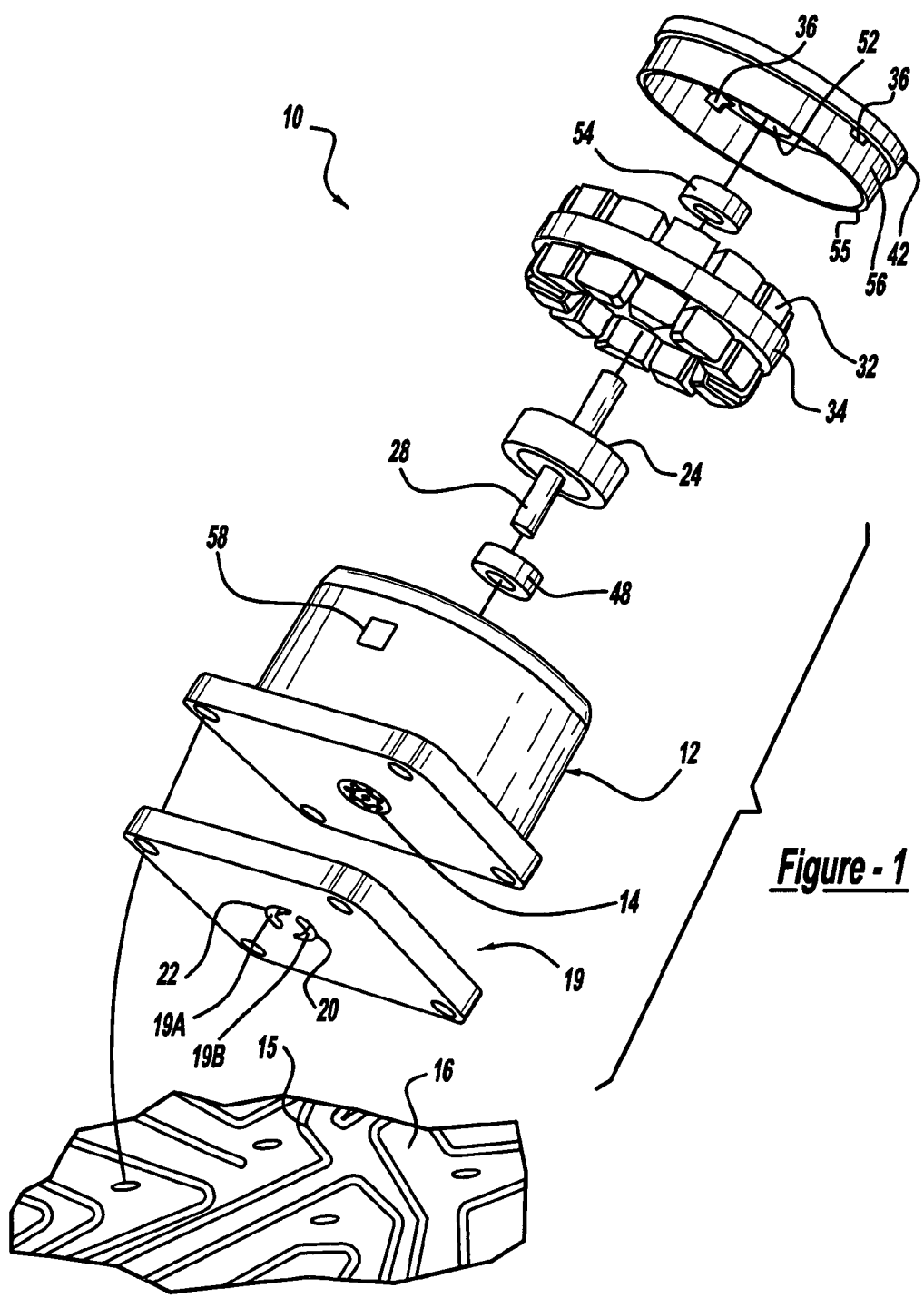
FIG. 1 is an exploded view of the pump elements in accordance with the present invention.

In accordance with the present invention, there is provided a fluid pump, generally indicated at 10, for pumping fluid of a vehicle having a reservoir. The pump 10 includes a housing 12, including a pumping element 14 therein. A pump mounting face 16 is provided for mounting of the pump in the reservoir 18. Pump mounting face 16 preferably is a transmission case, valve body, engine block or the like, with an inlet.

In a preferred embodiment, pump mounting face is external of the pump and uses existing oil pan or transmission fixtures. This provides for the necessary amount of oil for the inlet without using extra space in the pump housing, therefore, using less space inside the oil pan or transmission. In a preferred embodiment, an existing valve manifold VM in a transmission has worm trails 15 configured to provide inlet and outlet porting. A porting plate 19 (which in a preferred embodiment is a valve manifold cover) is provided for providing intake or outlet porting holes, 19A and 19B, respectively, into the pumping chamber 17. Alternatively, the plate 19 and pump housing 12 could be integral with one another.

The pump receiving area includes at least one intake port 20, and may include a second port 22, for receiving fluid from the reservoir external to the pump and pumping the fluid. As shown in the drawings, the pump element 14 is preferably attached to rotor shaft and armature assembly 24 of an electric motor generally shown at 26. A gerotor set type pump element is shown. However, other pump elements or types of pumps such as a piston, spur gear, vane, crescent element, centrifugal, turbined and regenerative type pumping systems may be readily utilized. The motor is preferably a brushless motor includes a rotor shaft 28 with magnets 30 in a carrier 31 around the rotor shaft, and coils 32 wound around stator 34. Magnets 30 are configured for reduced windage either by using a polarized cylinder magnet or by filling between magnet segments for providing a full round.

In a preferred embodiment, the stator 34 and armature 24 are configured in a self centering arrangement whereby the armature centers itself in the stator 34 along an axial direction. By positioning the stator, the armature may be biased toward the bearing 48 if desired, or biased for keeping the armature away from contact with the bearing 48 or toward or away from second bearing 54. Typically, the bearings are situated on either side of the armature as shown, however, as will be readily appreciated, the bearings could also be on either side of the pumping element if desired.

In a preferred embodiment, housing 12 includes motor casing portion 40 and a motor cap portion 42. The casing includes a locator shelf 44 and an annular wall 46. The stator is press fit into the housing and abuts against the locator shelf 44. Alternatively, the stator is secured by being roll pinned in place or by other securing means. A bearing 48 is provided which is prefit into cavity 50 in the housing 12. Bearing 48 rotatably receives rotor shaft 28 therein. The motor cap includes a second bushing receiving cavity 52 for press fit of a second bearing 54 therein. Bearing 52 rotatably receives the other end of shaft 24.

Cap 42 includes lip 55. Lip 55 radially abuts the stator 34. Stator 34 is press fit into the housing. Outer rim 56 of cap 42 is secured in portion 56 and retained either by press fit, rivet, weld, glue or crimped.

In a preferred embodiment of the present invention, the motor may be easily maintained in an open position without the cap 42 if desired, with an upper portion of the pump housing including an opening 36 therein, which allows the motor to be lubricated and/or cooled with the fluid in the reservoir 18. Because the motor is brushless, sealing of the unit is not critical. Parts may be provided for allowing oil to enter and lubricate and cool the motor. A brush type motor can also be employed in the pump of the present invention.

In the case of a brushless motor, a motor controller 58 is utilized for control of the motor function. The motor controller 58 may be positioned anywhere on the motor housing or within the motor housing to take advantage of cooling from the fluid contained in the reservoir. Alternatively, the controller could be remotely positioned in the engine controller unit or elsewhere in the transmission and electrically connected to the motor.

Figure 2:
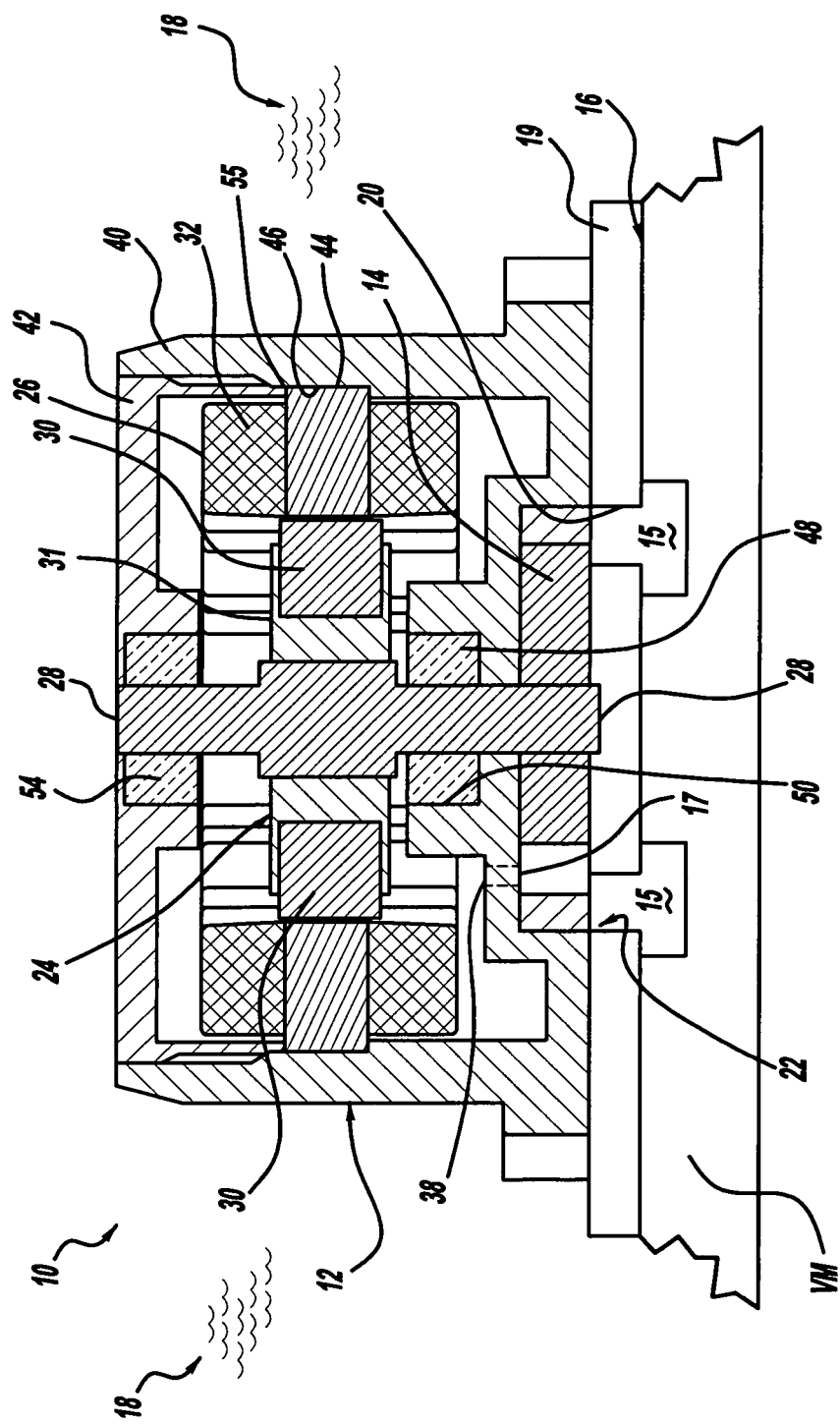
FIG. 2 is a sectional view of the pump of FIG. 1.

In an alternate embodiment, the intake to chamber porting is taken through the housing in an alternate embodiment, as shown in the dashed lines at 38 of FIG. 2. This has the advantage of cooling the motor, since oil is flowing through the opening 36 through the interior of the chamber. The opening may be open or a filter unit can be fit over the motor for filtering of oil or transmission fluid.

In the present invention, the pump may be provided for readily adapting to an existing mounting flange for pump porting typically provided in the reservoir of, for instance, a transmission valve body. The pump motor is preferably brushless, which eliminates any problems with brush contamination in operation, and a mechanical means for driving the pump is not necessary. This allows packaging of the present pump assembly in locations previously not thought appropriate to place an electric pump. The advantages of the pump are that it is compact in size, it can be operated submerged, and has a resulting reduced pump noise. Additionally, the porting and fluid passages typically found in the pumps are eliminated and placed in the mounting surfaces, where real estate is not normally an issue. Additionally, because the pump is submerged in the reservoir, corrosion, external leaks from the pump and necessary concerns with respect to sealing of the device at the mounting location and such are not an issue with the present invention, all contributing to reduced cost of manufacture.

The pump of the present invention also allows on demand operational conditions. Because it is electric, the pump can be turned on, off or modulated, independent of engine speed and to match desirable operating conditions. For example, the pump may be started prior to necessary usage requirements, eliminating ramp-up times and system lag found in start-up conditions of typical mechanical pumps. As an alternate example, the pump can be used when the engine is off to keep the transmission charged, i.e., pressure on the clutches and filling the torque converter.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

What is claimed is:

1. A pump for pumping fluid in a vehicle having at least one fluid reservoir, said pump comprising:
    a pump housing having a flange with a pump element disposed therein, the pump element being in direct contact with the fluid to be pumped;
    an electric motor operatively attached to and completely disposed within said pump housing;
    a pumping chamber;
    the pump element operatively coupled to said electric motor;
    said pumping chamber including an intake port for receiving fluid from said fluid reservoir and an exit port for pumping fluid from said fluid reservoir, wherein said intake port and said exit port are oriented along a plane that extends adjacent the flange of the pump housing;
    an inlet or outlet porting plate member adjacent to said pump, wherein said inlet or outlet porting plate member includes at least one area defining an inlet or outlet passage, wherein said inlet or outlet passage is in fluid communication with said intake port or said exit port of said pumping chamber; and
    at least one other intake port or exit port derived from porting configured in a surface adjacent to said inlet or outlet porting plate member and not formed integrally with said inlet or outlet porting plate member, wherein said at least one other intake port or exit port is in fluid communication with said inlet or outlet passage of said inlet or outlet porting plate member; and
    wherein said pump is submerged within said fluid reservoir of said vehicle;
    wherein said fluid reservoir is selected from the group consisting of a transmission, transfer case, engine reservoir, and combinations thereof.

2. The pump of claim 1 wherein there is a wall separating the motor from the pumping chamber and said wall includes an inlet or outlet port from said pumping chamber.

3. The pump of claim 1 wherein said inlet or outlet porting plate member is an integral part of said pump housing.

4. The pump of claim 3 wherein said inlet or outlet porting plate member is a portion of valve manifold plate for placement of said pump onto a valve manifold of said transmission.

5. The pump of claim 1 wherein said pump housing is an integral part of a valve manifold of said transmission.

6. The pump of claim 2 wherein said wall includes an inlet for pumping fluid through said motor.

7. The fluid pump of claim 1 wherein said motor pump is brushless.

8. The pump of claim 1 wherein the pump element is mounted on an armature shaft of said motor.

9. The pump of claim 1 wherein said motor further comprises an outer armature stator with a series of coils therein and an inner armature that is magnetically biased for self-centering of said armature in said stator.

10. The pump of claim 9 wherein a bearing is provided for said armature and said stator is mounted in said housing for biasing said armature toward said bearing.

11. The pump of claim 9 wherein a bearing is provided for said armature, wherein said stator is selectively operable to prevent said armature from contacting said bearing.

12. The pump of claim 9 wherein said armature includes a plurality of peripheral magnets separated by a space in between, wherein the space in between said plurality of peripheral magnets is substantially minimized to prevent windage of said armature.

13. The pump of claim 9 wherein said armature includes a polarized full round magnet for reducing windage.

14. The pump of claim 1 wherein said pump is operable to respond to on demand requirements of said engine, transmission or transfer case.

15. The pump of claim 14 wherein the on demand requirement is keeping said transmission charged during engine off conditions.

16. The pump of claim 1 wherein said pump is fully submerged in the fluid in said engine reservoir.

17. The pump of claim 1 wherein a motor controller is attached to said pump housing for controlling a brushless motor.

18. The pump of claim 1 wherein said pump housing is open to said electric motor, allowing fluid to reach said electric motor.

19. A pump for pumping of fluid from at least one fluid reservoir of a vehicle, said pump comprising:
  a submerged pump housing having a base, casing and a cap;
  a motor completely disposed within said pump housing and exposed to the fluid in the fluid reservoir;
  said motor including a self centering armature therethrough;
  a pump chamber at the base of said pump housing;
  a pump element located within the base and operably attached to said armature in said chamber for pumping fluid;
  an inlet or outlet porting plate member adjacent to the pump, wherein said inlet or outlet porting plate member includes at least one area defining an inlet or outlet passage, wherein said inlet or outlet passage is in fluid communication with said pump chamber; and
  a surface adjacent to and not formed integrally with said inlet or outlet porting plate member and operatively associated with said inlet or outlet passage of said inlet or outlet porting plate member and said pump chamber for providing an inlet and an outlet of fluid to the pump chamber contained in the pump housing, wherein said base and said inlet and said outlet are oriented along a common plane, and said surface including at least one oil fill passage connecting said fluid reservoir to said pump chamber for intake and pumping of said oil from said fluid reservoir;
  wherein said pump is submerged within said fluid reservoir of said vehicle;
  wherein said fluid reservoir is selected from the group consisting of a transmission, transfer case, oil reservoir, and combinations thereof;
  wherein said pump element is selected from the group consisting of a gerotor. piston, spur gear, vane, crescent element, centrifugal, turbined, regenerative type pump, and combinations thereof.

* * * * *